US006668632B2

United States Patent
Ford et al.

(10) Patent No.: US 6,668,632 B2
(45) Date of Patent: Dec. 30, 2003

(54) SPARK APPARATUS WITH PRESSURE SIGNAL RESPONSE AMPLIFICATION

(75) Inventors: Dean M. Ford, Yorktown, IN (US); Diane E. Hageman, Fishers, IN (US); Ronald J. Kiess, Decatur, IN (US); Robert A. Noel, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/213,636

(22) Filed: Aug. 6, 2002

(65) Prior Publication Data

US 2002/0189334 A1 Dec. 19, 2002

Related U.S. Application Data

(63) Continuation-in-part of application No. 09/799,362, filed on Mar. 5, 2001.

(51) Int. Cl.[7] ............... G01M 19/00; G01L 23/22; F02P 11/00
(52) U.S. Cl. ............... 73/118.1; 73/35.12; 123/634
(58) Field of Search ............... 73/35.07, 35.12, 73/35.08, 118.1; 123/634, 637

(56) References Cited

U.S. PATENT DOCUMENTS

| 4,169,388 | A | * | 10/1979 | Teitelbaum et al. ........... 73/714 |
| 5,672,812 | A |   | 9/1997  | Meyer ...................... 73/35.07 |
| 5,955,826 | A |   | 9/1999  | Suzuki et al. ............... 313/119 |
| 6,119,667 | A |   | 9/2000  | Boyer et al. ................ 123/634 |
| 6,122,971 | A |   | 9/2000  | Wlodarczyk ................. 73/705 |
| 6,131,465 | A | * | 10/2000 | Wlodarczyk et al. ......... 73/715 |

FOREIGN PATENT DOCUMENTS

GB        2304812 A   *   3/1997   ........... G01L/23/22

* cited by examiner

*Primary Examiner*—Hezron Williams
*Assistant Examiner*—Tamiko Bellamy
(74) *Attorney, Agent, or Firm*—Jimmy L. Funke

(57) ABSTRACT

An ignition coil, spark plug, and pressure sensor for an internal combustion engine are, in a preferred embodiment, integrated into a single assembly and mounted directly on a plug hole of an internal combustion engine. A hard spark plug shell serves as a pressure member and on which a strain gage is affixed. Changes in the pressure in the combustion chamber deform the shell, causing a corresponding change in the resistance of the strain gage. A bridge circuit or the like is used to measure the resistance change thereby providing a direct indication of cylinder pressure.

23 Claims, 3 Drawing Sheets

SPARK APPARATUS WITH PRESSURE SIGNAL RESPONSE AMPLIFICATION

RELATED APPLICATIONS

This application is a continuation-in-part (CIP) of copending U.S. application Ser. No. 09/799,362 filed Mar. 5, 2001, hereby incorporated by reference.

TECHNICAL FIELD

The present invention relates to a spark generating apparatus with a pressure sensor.

BACKGROUND OF THE INVENTION

An ignition coil for an internal combustion engine that is installed directly on an engine and that is directly coupled with spark plugs is known (e.g., a "pencil" coil). However, such conventional ignition coils and/or spark plugs do not generally incorporate a pressure sensor. A pressure sensor mounted on a spark plug is known as disclosed in U.S. Pat. No. 5,672,812 to Meyer.

Meyer discloses a magnetostrictive pressure sensor device attached to a spark plug shell. The disclosed approach, however, requires a magnetized spark plug shell. This increases cost, and subjects the resulting signal to noise due to environmental factors (e.g., magnetic and electrical noise in an automotive environment).

U.S. Pat. No. 6,122,971 to Wlodarczyk discloses use of a fiber optic for a pressure sensor integrated with a spark plug. U.S. Pat. No. 5,955,826 to Suzuki et al. disclose a spark plug with an opening in the threads to allow some combustion gases into a sealed chamber that houses a piezoelectric sensor for pressure sensing. This method has a disadvantage in that the opening can become clogged over time, impairing performance.

U.S. Pat. No. 6,119,667 to Boyer et al. disclose an integrated spark plug/ignition coil with a pressure sensor for an internal combustion engine. The sensor is disclosed as a magnetostrictive sensor, and is further disclosed as using a radially polarized biasing magnet and a sensing winding. As with the Meyer device, additional components such as a magnet are needed, which may increase cost and complexity. Thus, all of the foregoing are considered increased cost alternatives with drawbacks.

Ion sense methods are also known for detecting cylinder pressure; however, such methods are indirect approaches for determining pressure.

There is therefore a need for an improved spark generating apparatus with pressure sensing for an internal combustion engine that minimizes or eliminates one or more problems as set forth above.

SUMMARY OF THE INVENTION

An object of the present invention is to solve one or more of the problems as set forth in the Background. An advantage of an apparatus according to the invention is that it provides a high quality signal indicative of a pressure detected in a combustion chamber of an internal combustion engine. The high quality signal is generated at a comparatively higher level than certain other pressure sensors conventionally used. The present invention provides a high signal-to-noise ratio under all operating conditions. Moreover, if combustion pressures are to be measured by way of strains in the spark plug shell structure, the present invention provides a larger signal, and thus the improved signal-to-noise ratio mentioned above. The end result is a reduced cost, better quality product. Moreover, the invention avoids degradation over time due to a clogged opening, such as in Suzuki et al.

According to the invention, an apparatus is provided for initiating a spark that is suitable for installation in a cylinder of an internal combustion engine. The apparatus includes a central electrode having a main axis, an insulator, and a conductive shell. The central electrode has opposing first and second ends. The first end is configured for connection to a high voltage source. The insulator is outwardly of the central electrode. The conductive shell is generally disposed outwardly of the insulator, and includes a central bore. The shell also has an upper portion that extends radially, inwardly so as to cover and seal an upper part of the insulator. This is an upper seal, and it has an associated first spring rate. A lower seal is provided between the insulator and an inner shoulder feature of the shell facing the central bore. The lower seal has a second spring rate that is less than the first spring rate. The lower seal may be located proximate outer threads formed on the shell which are used to install and secure the apparatus to a cylinder head. The upper and lower seals are configured to prevent combustion gases from escaping from the cylinder, as known. Increased pressure in the cylinder will cause a deflection in the shell. A transducer is therefore affixed to the shell and is configured to produce a signal indicative of a pressure level in the cylinder.

In operation, the insulator is held by a preload between the upper and lower seals. When a pressure is applied to the bottom of the spark apparatus (i.e., such as when combustion occurs), static equilibrium is achieved by a change in the level of the loads of the upper and lower seals. The load in the upper seal will increase while the load in the lower seal will decrease. The stress (strain) in that portion of the shell between the seals will respond according to the change in the load in the upper seal. The change in the load in the seals will be divided based on the stiffness of respective load paths. The lower seal is located nearer to the threaded engagement to the cylinder head than is the upper seal. The threaded engagement is the location at which the additional load from the combustion is reacted into. Thus, the lower seal would generally have a stiffer load path to the reaction point. According to the invention, however, the lower seal is configured to have a reduced spring rate, relative to the upper seal, which effectively increases the stiffness of the load path of the upper seal relative to the lower seal. This arrangement dramatically improves the signal level obtained when measuring stress (and strains) near the upper seal to an increased deflection, thereby improving a signal-to-noise ratio of the resulting signal.

In one embodiment, the lower seal may comprise a Belleville washer that is arranged in preload so that it exhibits a small, zero, or even negative spring rate. This configuration enhances the amplification effect of the pressure signal described above.

In another embodiment, the invention may be applied to glow plugs for a diesel engine.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
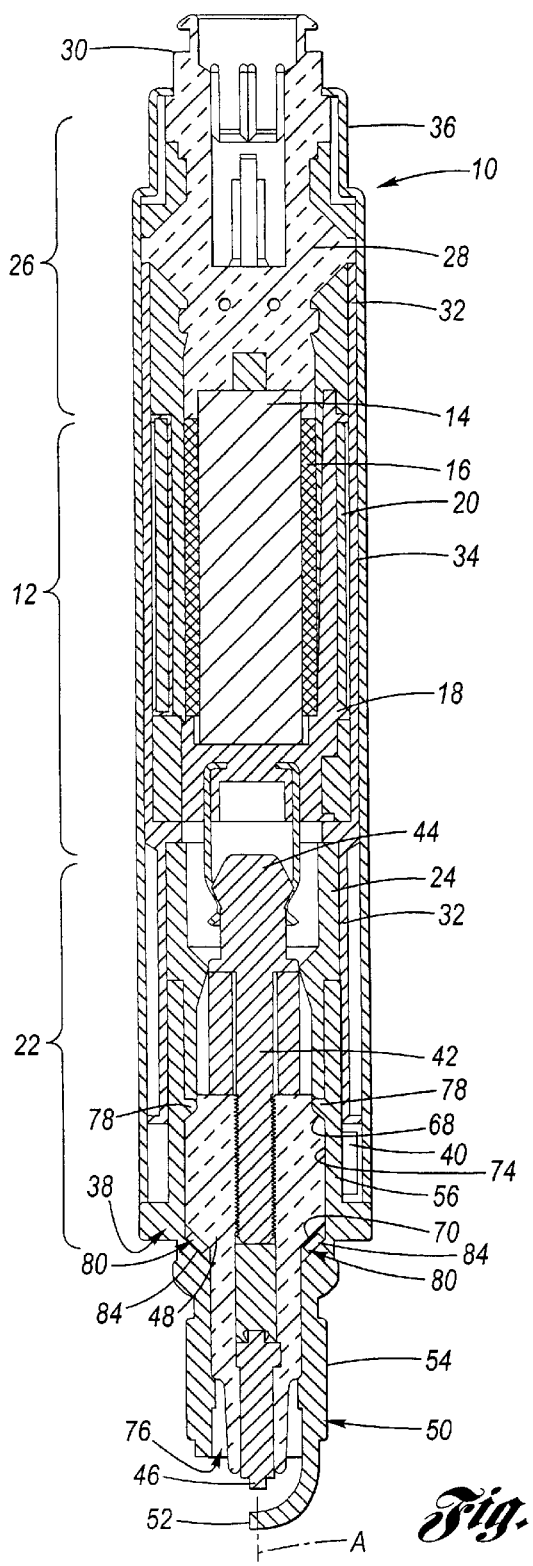
FIG. 1 is a sectional view of an integrated spark plug and coil with pressure sensor embodiment according to the present invention.
Figure 2:
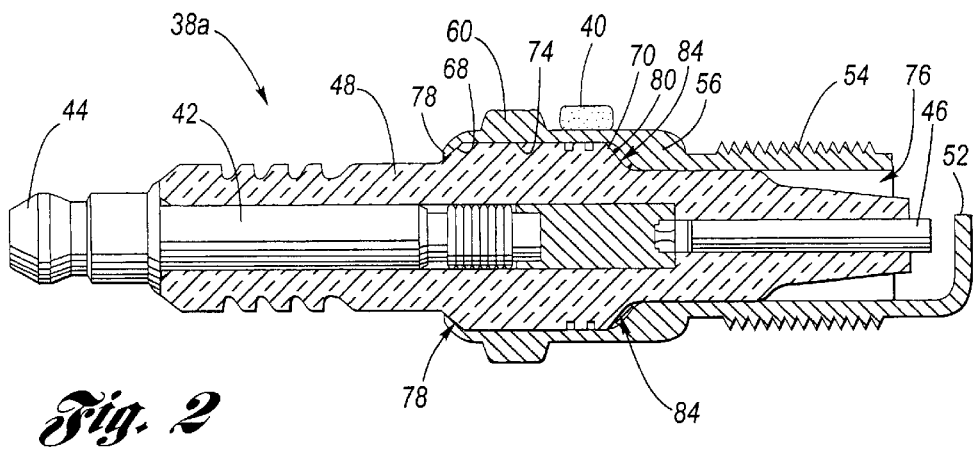
FIG. 2 is a sectional view of a first stand-alone spark plug embodiment of the present invention illustrating a single-step insulator type spark plug.
Figure 3:
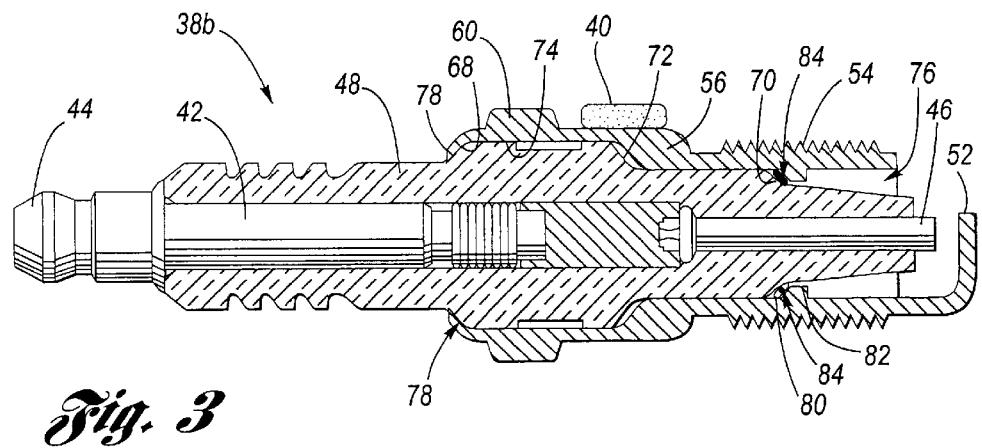
FIG. 3 is a sectional view of a second stand-alone spark plug embodiment of the present invention illustrating a two-step insulator type spark plug.
Figure 4:
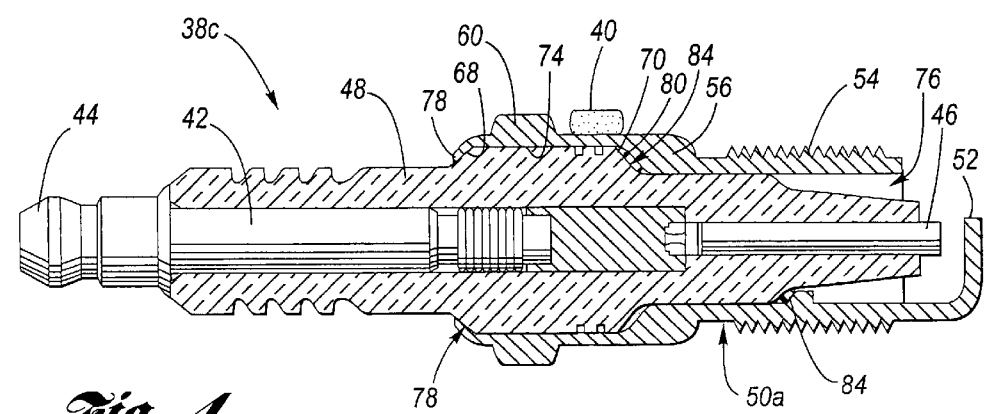
FIG. 4 is a sectional view of a third stand-alone spark plug embodiment of the present invention illustrating a pseudo two-step insulator type spark plug.
Figure 7:
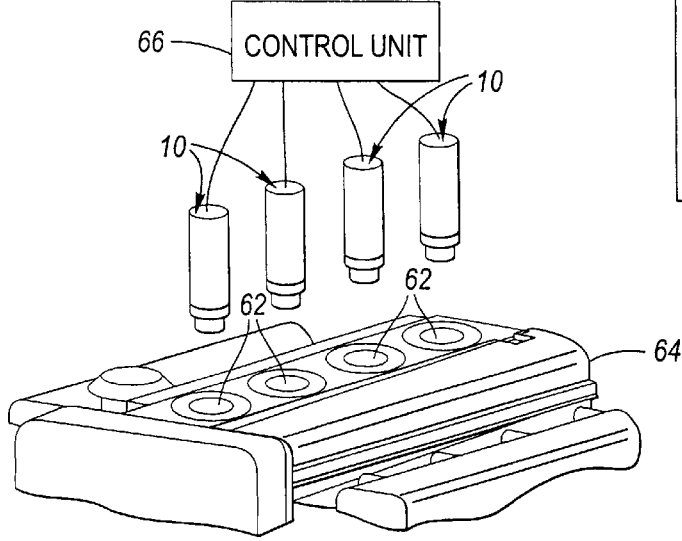
FIG. 7 is an exploded view of the embodiment of FIG. 1, together with an engine and a control unit.

Referring now to the drawings wherein like reference numerals are used to identify identical components in the various views, FIG. 1 shows one embodiment of the present invention, as implemented in an integrated ignition coil, spark plug and pressure sensor assembly 10. It should be understood, however, that other implementations are possible and remain within the spirit and scope of the invention, including stand-alone spark plug embodiments as shown in FIGS. 2–4. For example, the invention may be applied to a glow plug for use in a diesel engine. The assembly 10 is adapted for installation to a conventional internal combustion engine 64, which is accomplished using a spark plug shell installed so that it is in threaded engagement with corresponding threads of a spark plug opening 62. Opening 62 is in communication with a combustion cylinder (not specifically shown). This arrangement is best shown in FIG. 7.

FIG. 1 illustrates assembly 10 having a transformer portion 12 comprising a core 14, a primary coil 16, a secondary spool 18 and a secondary coil 20, a connection portion 22 comprising a high-voltage boot 24, a control circuit portion 26 comprising an assembled connector portion 28 and a circuit interface portion 30, a coil case 32, an outer housing or shield 34 comprising a fastening head 36, a spark plug assembly 38, and a pressure sensor assembly comprising a transducer 40. The foregoing elements (other than elements 38 and 40) may comprise conventional components, and will therefore be described nearer the end of this document in greater detail.

According to the present invention, improvements have been made to spark plug assembly 38 that provide the capability to generate an improved quality signal indicative of pressure in the combustion chamber. The spark plug assembly 38 comprises a transducer 40 associated therewith. Plug assembly 38 also includes a central electrode 42 having a first end 44 and a opposing second end 46, an insulator portion 48, and a shell 50 comprising (i) a second, ground electrode portion 52, (ii) a threaded portion 54 and (iii) a center portion 56.

Transducer 40 is configured to produce a signal indicative of a pressure level in the cylinder of engine 64. Transducer 40 may comprise any type of sensor that has the capability of sensing or detecting a varying stress or strain in a mechanical structure (i.e., the shell 50) of the spark plug assembly 38. For example, transducer 40 may comprise a conventional strain gage sensor affixed or adhered to shell 50, an optical pressure sensor in sensing relation to shell 50 or a reluctance sensor in surrounding relation to shell 50 configured to detect a change of the reluctance of a stressed material, to name a few.

Additionally, such strain gages may comprise either conventional types (i.e., zig-zag pattern where the trace reverses direction back and forth) or a type applied via a resistive ink application process. The resistive ink approach is "printed" on the target structure, for example, in the shape of a rectangle. The optical sensor may be arranged to sense changes or movements in shell 50, which are indicative of pressure changes. A reluctance sensor may comprise a small coil surrounding the shell, which acts like a core. Changes in the shell affect the overall electrical characteristic of the coil/shell combination, which can be sensed.

Transducer 40, in a strain gage embodiment, may be affixed in an axial (i.e., tension) arrangement, or, in an alternate embodiment, in a circumference (i.e., hoop stress) manner to center portion 56 of shell 50. Conventional adhesives known for the purpose of affixing strain gages may be used, with due regard for the expected elevated temperature of an engine. Where the transducer 40 is a strain gage, it may be electrically connected to a bridge circuit (see FIGS. 8–10 for example), by way of a bundle of wires (preferred) or by use of a flex circuit (which are known). The bundle of wires approach has the advantage of reduced cost (compared to a flex circuit). The flex circuit has improved flexibility in managing RFI and the like. Using, for example, a resistive bridge, and attaching the transducer 40 to the spark plug shell 50, the described arrangement will indicate the cylinder pressure of a running or motoring heat engine. The pressure applied to the center insulator of the spark plug during the piston strokes will cause a deflection of the insulator, which results in a strain in the spark plug shell 50. Such flexure will result in a change of resistance of the transducer 40, and hence serve to vary the output of the bridge. A direct correlation of cylinder pressure to resistance change is measurable during the cycles of the heat engine.

Central electrode 42 extends in a generally longitudinal direction and has a main axis, designated "A", associated therewith. First end 44 of central electrode 42 is configured for connection to a relatively high voltage source (i.e., spark voltage), as known. The second end 46 of electrode 42 is exposed, and is spaced apart from ground electrode 52 to define a spark gap therebetween.

Insulator 48 is annular in configuration and is located generally radially outwardly of central electrode 42. In the illustrative embodiment of FIG. 1, insulator 48 includes an annular first shoulder 68, an annular second shoulder 70 and a radially enlarged central body portion 74. In other embodiments, such as the embodiment of FIG. 3, insulator 48 may further include a third annular shoulder 72 axially intermediate first and second shoulders 70 and 74. Shoulders 68, 70 and 72 may be tapered.

Annular conductive shell 50 preferably comprises metal and is disposed generally radially outwardly of insulator 48, and includes a central bore 76, a first, upper annular seal 78, and, in the illustrated embodiments, an inner annular shoulder 80 facing central bore 76. In an alternate embodiment best shown in FIG. 3, inner shoulder 80 extends axially to form a ledge 82 (i.e., shoulder 80 extends axially toward the spark gap end and then projects outwardly so as to increase the diameter of central bore 76). In the illustrated embodiments, inner shoulder 80 may be tapered. In addition, spark plug assembly 38 further includes a second, lower annular seal 84.

Seals 78 and 84 are included in the spark plug assembly 38 to prevent bleeding off of pressure in the combustion chamber produced by burning of an air/fuel mixture during engine operation. The first annular seal 78 is formed by an upper part of shell 50 which extends in a circumferential fashion and projects radially inwardly over the first annular shoulder 68 of the insulator 48. First, upper annular seal 78 may be characterized as having a first spring rate (K1—see FIG. 7). Second annular seal 84 may be formed of material and of such construction such that it has or may be biased to have a relatively low spring rate (i.e., stiffness) and that is relatively stable mechanically over conventionally encountered operating temperatures. Seal 84 is disposed between lower shoulder 70 of insulator 48 and inner shoulder 80 of shell 50. Second, lower annular seal 84 may be characterized as having a second spring rate (K2) that is less than the first spring rate K1.

FIGS. 2–4 shows the details of the present invention in various embodiments, in an enlarged form. It should be understood specifically that the depiction of the spark plugs in stand alone form (with hex nut portion) rather than in a form for integration with an ignition coil (with a flange for welding to shield 34) is exemplary only and not limiting in nature.

FIG. 2 shows an alternate embodiment of the present invention, namely, spark plug assembly 38*a*. Spark plug assembly 38*a* is adapted for stand-alone use (i.e., is not integrated with an ignition coil), although it could be used with a conventional pencil coil. Spark plug assembly 38*a* is substantially identical to spark plug assembly 38 shown in FIG. 1, with the exception that shell 50 is modified to include a nut portion 60 adapted to receive a tool for installing the same in threaded aperture 62 of engine 64. The insulator 48 of assembly 38*a* is considered a "single step" insulator, inasmuch as it contains a single, annular "step" or shoulder between the central body portion 74 thereof and the spark gap end.

FIG. 3 shows yet another embodiment of the present invention, namely, spark plug assembly 38*b*. Spark plug assembly 38*b* is adapted for stand-alone use (i.e., is not integrated with an ignition coil), although it could be used with a conventional pencil coil. Spark plug assembly 38*b* is substantially identical to spark plug assembly 38*a*, with the exception of the configuration of insulator 48. Insulator 48 in FIG. 3 is a so-called "two step" insulator, since it includes two tapered annular shoulders (shoulder 70 and shoulder 72) between central body portion 74 thereof and the spark gap end. In assembly 38*b*, the second, lower seal 84 is disposed between the tapered lower shoulder 70 of insulator 48 and the inner ledge 82 of shell 50.

FIG. 4 is a split, cross-sectional view of a still further embodiment of the present invention, namely, spark plug assembly 38*c*. Spark plug assembly 38*c* is adapted for stand-alone use (i.e., is not integrated with an ignition coil), although it could be used with a conventional pencil coil. Spark plug assembly 38*c* is substantially identical to spark plug assembly 38*b*, with the exception of the configuration of insulator 48. The bottom half of FIG. 4 shows the "two step" insulator of FIG. 3 for providing a frame of reference. The upper half of FIG. 4, however, shows a so-called pseudo two step insulator 48, since it includes two tapered shoulders between central body portion 74 and the spark gap end, but the lower seal 84 is located proximate the central shoulder of the three that are shown. Assembly 38*c* is characterized by a shorter insulator tip length for reduced fouling.

Referring now to FIGS. 1, and 2–4, one problem in the art, as set forth in the Background, involves accurately and economically sensing pressure in the cylinder of an internal combustion engine. Particularly, for engine control, there is a need for ways to monitor engine cylinder pressure by a method which is economical enough such that it could be applied in a mass production environment. One approach, generally, is to detect stresses or strains in the spark plug, since the spark plug is directly exposed to the cylinder combustion pressure.

The invention improves upon the known art, and provides an improved quality pressure indicative signal. The insulator 48 is held by a preload between the upper and lower seals 68 and 84, respectively. When a pressure is applied to the bottom of the spark plug assembly 38 (i.e., such as when combustion occurs), static equilibrium is achieved in the assembly by a change of the loads allocated to each of the upper and lower seals 68, 84. The load in the upper seal 68 will increase while the load in the lower seal 84 will decrease. The stress (strain) in the portion of the shell 50 between the seals 68 and 84 will respond according to the change in the load of the upper seal 68. The change in the respective loads in the seals will be divided based on the stiffness of the two load paths, which is made up of the stiffness of the seal itself plus the stiffness of the intervening structure (i.e., shell) to the reaction point (i.e., threaded engagement with the cylinder head). The lower seal 84 is located nearer to the threaded engagement to the cylinder head than is the upper seal 78. Thus, the lower seal 84 generally has a stiffer load path to the reaction point. According to the invention, however, the lower seal 84 itself is configured to have a reduced spring rate (i.e., stiffness), relative to the upper seal 78, which in-effect increases the relative stiffness of the load path of the upper seal 78 relative to the lower seal 84. This arrangement dramatically improves the signal level obtained when measuring stress (and strains) near the upper seal 78, due to the increased deflection of shell 50, thereby improving the signal quality (i.e., a signal-to-noise ratio). In one embodiment, the lower seal 84 may comprise a Belleville washer that is arranged in a preload condition so that it exhibits a small, zero, or even negative spring rate.

Figure 5:
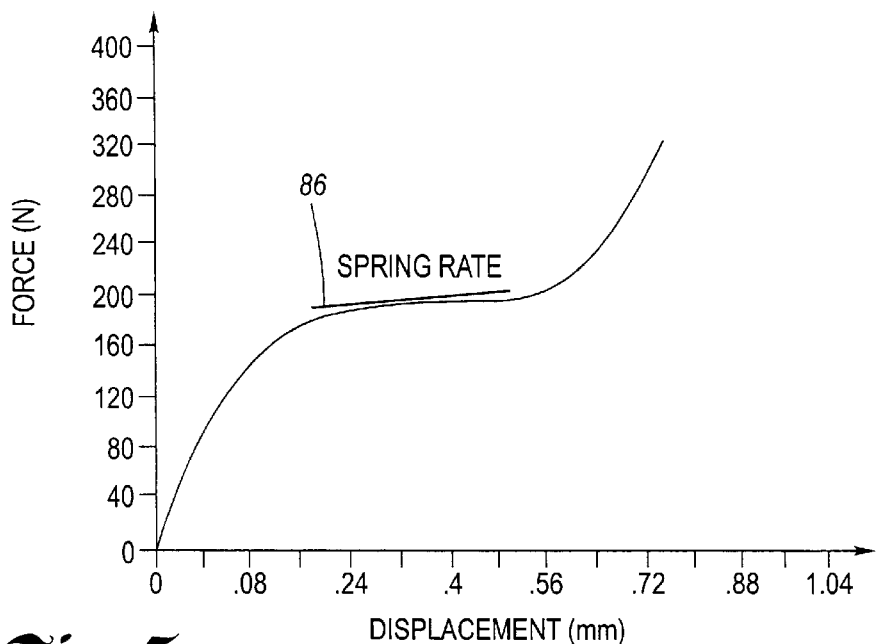
FIG. 5 is a load versus displacement graph showing a typical preload force on a Belleville washer to obtain a reduced spring rate for the lower seal shown in FIGS. 1 and 2–4.

FIG. 5 shows the an exemplary load deflection curve for such a Belleville washer. For example, based on the sample, illustrated response, if the preload force applied to such a Belleville washer is in the 200 Newton range, then the Belleville washer will exhibit a relatively flat, low value slope or spring rate 86. Other Belleville washer configurations may provide a spring rate (in preload) around zero, or even negative, as described above. Thus, any further applied force, above and beyond the preload, for example, arising from pressure due to combustion, will encounter very little stiffness at the lower seal 84. This configuration enhances the amplification effect described above, since the load will be divided up so as to drop mostly over the upper seal 78, causing a much greater deflection, and thus a much greater signal level.

Figure 6:
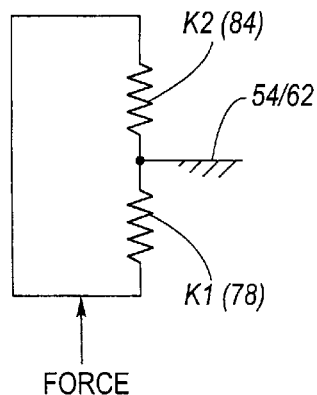
FIG. 6 is a simplified schematic view of how a load is divided between the upper and lower seals.

FIG. 6 is an illustration which facilitates understanding the operation of the foregoing arrangement. A force applied at the bottom of spark plug assembly 38 will all react eventually into the support structure, namely, the cylinder head a the point where the spark plug is threaded in. However, a first portion of the force travels through the lower "spring" (seal 84 with spring rate K2) while the remainder of the force travels through the upper "spring" (seal 78 with spring rate K1). The force in the upper structure will be proportional to K1/(K1+K2). Therefore, if the spring rate K2 is reduced, virtually all of the load will travel through the upper structural path, which would make detection of the stress (strain) much easier.

FIG. 7 depicts several integrated spark plug coil and pressure assemblies 10 connected to a respective plug holes 62 of an engine 64. The assemblies are in turn connected to the engine control unit 66 that may include appropriate control logic to use the pressure information detected by transducer 40. As described above, the present invention is configured to detect cycle-to-cycle pressure information and generate a respective pressure signal indicative of the detected pressure for each cylinder. Such plurality of pressure signals may be used by engine control unit 66 for calibrating engines to achieve improved performance with regard to fuel economy and exhaust emissions, while reducing indicated mean effective pressure (IMEP) variation. The output pressure signals are useful for closed-loop feedback control of combustion. Such control includes locating a peak cylinder pressure (e.g., with respect to top dead center—TDC), controlling cycle-by-cycle variation in IMEP and monitoring rate of pressure rise for each cylinder. In addition, one or more of the pressure signals may be used to detect misfire, knocking, or pre-ignition for a cylinder on an event-by-event basis. Additionally, positive control of spark timing, spark energy, air-fuel ratio, and charge dilution are possible using one or more of the pressure signals to thereby provide improvements in engine stability while reducing fuel consumption and exhaust emissions.

Figure 8:
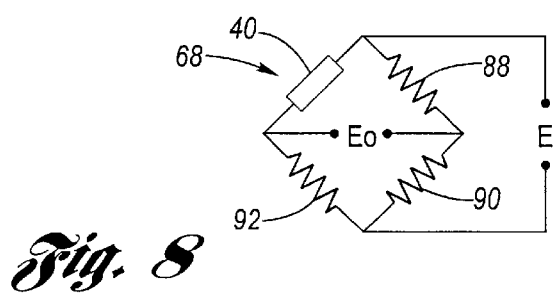
FIG. 8 is a schematic view of an exemplary bridge circuit for use with the embodiments of FIGS. 1 and 2–4.

FIG. 8 shows an exemplary resistive bridge 68 including transducer 40, and a plurality of resistors 88, 90 and 92. As arranged in FIG. 8 an input voltage designated E is applied to the bridge, as known to those of ordinary skill in the art. An output pressure signal $E_o$ is indicative of the detected pressure in the cylinder of engine 64 to which the embodiment of the invention is installed. Of course, it should be understood that the resistive bridge shown in FIG. 8 is simplified and is illustrated and described in exemplary terms only. More sophisticated arrangements, as well as calibration and scaling considerations, all such factors being well known to those of ordinary skill in the art, may be included and are considered within the spirit and scope of the present invention. Moreover, other conditioning circuits for detecting the resistance change presented by transducer 40 may be used, and also remain within the spirit and scope of the present invention.

Figure 9:
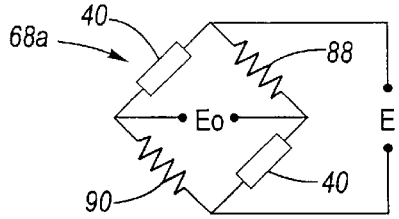
FIGS. 9–10 are schematic views of alternative bridge circuits.
Figure 10:
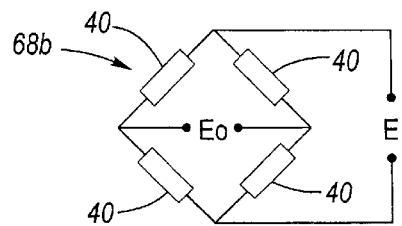

FIG. 9 is a simplified half bridge circuit 68a. Circuit 68a includes two active elements 40, but is otherwise the same as circuit 68. FIG. 10 is a simplified full bridge circuit 68b, which includes four active elements 40, circuit 68b has a first pair of opposing (on the diagonals) elements 40 arranged to detect positive strains and the other pair of elements 40 arranged to detect negative or zero strains. This setup could be used for opposing temperature compensation (i.e., where a pair is setup to detect zero strain).

A more detailed description of the integrated ignition coil/spark plug embodiment of FIG. 1 will now be set forth to facilitate those of ordinary skill in the art to practice the present invention.

With reference to FIG. 1, assembly 10 has a substantially rigid outer housing 34 at one end of which is the spark plug assembly 38 and at the other end of which is the control circuit interface portion 30 for external electrical interface with a control unit 66 (best shown in FIG. 7), such as an engine control unit. The primary and secondary windings 16, 18 are arranged in a substantially coaxial fashion along with a high permeability magnetic core 14. All high voltage ignition system components are housed or are part of the integrated ignition coil, spark plug, and pressure sensor assembly 10. Generally, the structure is adapted for drop in assembly of components and sub-assemblies as later described.

Transformer portion 12 and control-circuit portion 26, which are provided for high-voltage generation, are inserted into outer housing 34. The control-circuit portion 26 responds to instruction signals from an external circuit (not shown) to cause a primary current to initially flow through primary coil 16 and then be interrupted when a spark is desired. The control circuit 26 may be external to the integrated coil/spark plug assembly 10. Connecting portion 22, which supplies a relatively high secondary voltage generated by the transformer portion 12 to the spark plug 38, is provided in a lower portion of the outer housing 34.

The outer housing 34 may be formed from round tube stock for example comprising nickel-plated 1008 steel or other adequate magnetic material. Where higher strength may be required, such as for example in unusually long cases, a higher carbon steel or a magnetic stainless steel may be substituted. A portion of the outer housing 34 at the end adjacent to the control circuit interface portion 30 may be formed by a conventional swage operation to provide a plurality of flat surfaces, thereby providing a fastening head 36, such as a hexagonal fastening head for engagement with standard sized drive tools. Additionally, the extreme end is rolled inward to provide necessary strength for torque applied to the fastening head 36 and perhaps to provide a shelf for trapping a ring clip between the outer housing 34 and the connector body 30. The previously assembled primary and secondary sub-assemblies are loaded into the outer housing 34 from the spark plug end to a positive stop provided by the swaged end acting on a top end portion of the connector body.

The transformer portion 12 is formed around the central magnetic core 14. The magnetic core 14 may be manufactured from plastic coated (insulated) iron particles in a compression molding operation. After the core 14 is molded, it is finish machined such as by grinding to provide a smooth surface absent, for example, sharp mold parting lines otherwise detrimental to the intended direct primary coil winding thereon.

Core 14 may also be formed using laminated thin silicon-steel plates of differing widths so that a cross section thereof becomes substantially circular. Optionally, magnets may be included as well in the core circuit. If included, the magnets may have polarity of reversed directions of magnetic flux generated by excitation by the primary coil 16 and are disposed on both ends of core 14.

The primary coil 16 may be, as shown, wound directly on the surface of the core 14. Coil 16 may be formed from insulated wire, which may be wound directly upon the outer cylindrical surface of the core 14. The winding of the primary coil 16 directly upon the core 14 provides for efficient heat transfer of the primary resistive losses and improved magnetic coupling which is known to vary substantially inversely proportionally with the volume between the primary coil 16 and the core 14. The core 14 is preferably assembled to the interior end portion of the connector body to establish positive electrical contact between the core 14 and a core-grounding terminal. However, the specific grounding of the core 14 is not essential to the operation of the present invention. Terminal leads of primary coil 16 may be connected to insert molded primary terminals by conventional processes such as soldering. Alternative constructions are possible, for example, via use of steel laminations for core 14 in combination with the primary coil wound on a primary coil spool (not shown). The foregoing is exemplary only and not limiting in nature.

The primary sub-assembly is inserted into the secondary coil spool 18. A secondary coil 20 may then be wound onto the outer periphery of the secondary spool 18. The secondary coil 20 may be either a segment wound coil or a layer (progressive) wound coil in a manner that is known to one of ordinary skill in the art.

The control-circuit portion 26 may contain circuitry for processing the pressure indicative signal and may be made up of a molded-resin switching element which controls a conduction current through the primary coil 16 to be intermittent, and a control circuit which is an igniter that generates the control signals of this switching element. Additionally, a heat sink, which may be a separate body, may be glued or otherwise adhered to the control-circuit portion 26 for heat radiation of circuit elements such as the switching element. However, as previously mentioned, the control-circuit portion 26 may be external to the spark plug assembly 38.

The interior of housing 34 retains the transformer portion 12, connector portion 28, and a high voltage boot 24. The coil case 32 is disposed within the outer housing 34 and is added to support the coil. For the assembly process, the wound primary coil 16 with assembled connector 28 is assembled to the wound secondary spool 18 and then into the coil case 32.

The above-described ignition coil and spark plug assembly 10 is inserted in a plug hole of an internal combustion engine and is fixed to an engine. The spark plug assembly 38 that is mounted on a bottom portion of the plug hole is received within the connecting portion 22, and a high voltage terminal portion 44 of the spark plug 38 electrically contacts high voltage connector portion. The steel shield 34 may be welded to the spark plug to form a pre-assembled unit. The pre-assembled unit is then screwed into the spark plug hole in the engine head in the conventional manner. The unit may then be self-supporting with no attachment bolts required.

According to this embodiment of the invention, a tube-portion cross section of the outer housing 34 is formed to be circular so that an inner-diameter dimension accommodates a plug hole 62, and an outer diameter thereof is established to be a suitable dimension as recognized by those skilled in the art.

As previously mentioned the coil case 32 is disposed within the outer housing 34. The coil case 32 extends from the spark plug shell 50 to the circuit interface portion 30. The coil case 32 also contains the core 14, primary coil 16, secondary spool 18, and secondary coil 20.

If a flex circuit is used for electrical connection of element 40, such a flex circuit 58 may comprise a multi-layer circuit. A ground plane layer thereof is disposed adjacent the coil case. Leads are then disposed on subsequent outer layers sandwiched between insulating layers. The ground plane, together with the insulating layers protect the connection leads from the high voltage of the coils and therefore reduces or eliminates noise coupling (i.e., electromagnetic interference or EMI). The circuit interface portion 30 connects to the electrical system of the vehicle to both provide an electrical input and control of the coils, and communication of the engine control unit with the pressure sensing assembly. Of course, as noted above, it is preferred that a bundle of wires be used for reduced cost.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A spark generating assembly configured to detect a pressure in a cylinder of an internal combustion engine, said assembly comprising:

a central electrode having a main axis and a first end configured for connection to a voltage source, said central electrode further having a second, exposed end opposite said first end;

an annular insulator outwardly of said central electrode, said insulator having an enlarged central body with a first annular shoulder and a second annular shoulder, wherein said insulator includes a third annular shoulder axially intermediate said first and second shoulders;

an annular conductive shell having a central bore, said insulator being disposed in said central bore, said shell extending circumferentially and radially inwardly over said first annular shoulder of said insulator to form a first seal having a first spring rate, said shell further having an annular inner shoulder facing said central bore;

a second seal having a second spring rate less than said first spring rate disposed between said second annular shoulder of said insulator and said inner shoulder of said shell, wherein said second seal comprises a Belleville washer arranged in a preloaded condition so as to exhibit said second spring rate, said washer having said second spring rate of about zero at a preselected preload force wherein further increases in said pressure in said cylinder above said preselected preload force will encounter reduced stiffness at said lower seal;

a ground electrode spaced apart from said second end of said central electrode defining a spark gap therebetween, said ground electrode being electrically connected to said shell; and a transducer affixed to said shell.

2. The assembly of claim 1 wherein said transducer comprises a strain gage affixed to said shell nearer to said first seal than to said second seal.

3. The assembly of claim 1 wherein said shell includes a threaded portion configured to mesh with corresponding threads in said engine for installation.

4. The assembly of claim 3 further comprising a bridge circuit electrically connected to said strain gage configured to generate a pressure signal indicative of a pressure in said cylinder of said engine to which said apparatus is installed.

5. The assembly of claim 4 further comprising a controller coupled to said bridge circuit and configured to process said pressure signal.

6. An apparatus for initiating a spark in a cylinder in a combustion engine comprising:

a central electrode having an axis and opposing first and second ends;

an insulator outwardly of said central electrode;

a conductive shell outwardly of said insulator and including a radially inwardly extending portion defining an upper seal having a first spring rate;

a lower seal between said insulator and said shell having a second spring rate less than said first spring rate wherein said lower seal comprises a Belleville washer arranged in a preloaded condition so as to exhibit said second spring rate, said washer having said second spring rate of about zero at a preselected preload force wherein further increases in said pressure in said cylinder above said preselected preload force will encounter reduced stiffness at said lower seal; and a transducer in sensing relation to said shell configured to produce a signal indicative of a pressure in said cylinder.

7. The apparatus of claim 6 wherein said lower seal comprises a Belleville washer arranged in a preloaded condition so as to exhibit said second spring rate.

8. The apparatus of claim 6 wherein said shell includes a threaded portion configured to mesh with corresponding threads in said engine for mounting thereto.

9. The apparatus of claim 6 wherein said transducer is affixed nearer to said upper seal than to said lower seal.

10. The apparatus of claim 9 wherein said transducer is affixed proximate said upper seal.

11. The apparatus of claim 6 wherein said insulator includes a first shoulder said upper seal extending radially inwardly over said first shoulder.

12. The apparatus of claim 11 wherein said first shoulder is tapered.

13. The apparatus of claim 11 wherein said insulator further includes a second shoulder, said shell including an inner shoulder, said lower seal being disposed between said second shoulder of said insulator and said inner shoulder of said shell.

14. The apparatus of claim 13 wherein said second shoulder of said insulator is tapered.

15. The apparatus of claim 13 wherein said inner shoulder of said shell is formed by an inner ledge.

16. The apparatus of claim 6 wherein said shell includes a nut portion configured to receive a tool for facilitating installation of said spark plug.

17. The apparatus of claim 6 wherein said shell includes a flange portion for welding to a shield of an ignition coil to thereby form an integrated unit.

18. The apparatus of claim 6 wherein said transducer comprises a strain gage configured to sense a strain in said shell.

19. The apparatus of claim 18 wherein said gage comprises a thick film piezo resistive strain gage.

20. The apparatus of claim 18 further comprising a bridge circuit electrically connected to said strain gage configured to generate a pressure signal indicative of a pressure in said cylinder of said engine to which said apparatus is installed.

21. The apparatus of claim 20 further comprising a controller coupled to said bridge circuit and configured to process said pressure signal.

22. A glow plug for a cylinder in a combustion engine comprising:

a central electrode having an axis and opposing first and second ends;

an insulator outwardly of said central electrode;

a conductive shell outwardly of said insulator and including a radially inwardly extending portion defining an upper seal having a first spring rate;

a lower seal between said insulator and said shell having a second spring rate less than said first spring rate wherein said lower seal comprises a Belleville washer arranged in a preloaded condition so as to exhibit said second spring rate, said washer having said second spring rate of about zero at a preselected preload force wherein further increases in said pressure in said cylinder above said preselected preload force will encounter reduced stiffness at said lower seal; and a transducer in sensing relation to said shell configured to produce a signal indicative of a pressure in said cylinder.

23. The glow plug of claim 22 wherein said combustion engine is a diesel cycle engine.

* * * * *